United States Patent [19]

Ide et al.

[11] 4,003,874

[45] Jan. 18, 1977

[54] PRODUCING GLASS-REINFORCED POLYOLEFIN COMPOSITIONS

[75] Inventors: Fumio Ide; Isao Sasaki, both of Ohtake, Japan

[73] Assignee: Mitsubishi Rayon Co., Ltd., Tokyo, Japan

[22] Filed: Aug. 30, 1972

[21] Appl. No.: 284,722

[30] Foreign Application Priority Data

Aug. 30, 1971 Japan .............................. 46-66501
Oct. 21, 1971 Japan .............................. 46-83512
Dec. 22, 1971 Japan .............................. 46-104317

[52] U.S. Cl. .......................... 260/42.18; 260/42.46
[51] Int. Cl.$^2$ .......................................... C08K 7/14
[58] Field of Search .......... 106/308 Q; 260/41 AG, 260/41 A, 42.18

[56] References Cited
UNITED STATES PATENTS

| | | | |
|---|---|---|---|
| 3,177,269 | 4/1965 | Nowak | 260/878 |
| 3,308,090 | 3/1967 | Falcone | 260/41 A |
| 3,416,990 | 12/1968 | Robinson | 260/41 AG |
| 3,437,550 | 4/1969 | Paul | 260/41 AG |
| 3,579,476 | 5/1971 | Rieke | 260/41 AG |
| 3,733,300 | 5/1973 | Fujita | 260/41 AG |

FOREIGN PATENTS OR APPLICATIONS 1,095,700   12/1967   United Kingdom

*Primary Examiner*—Paul R. Michl
*Attorney, Agent, or Firm*—Armstrong, Nikaido & Wegner

[57] ABSTRACT

A modified polyolefin obtained by adding to 100 parts by weight of a polyolefin 0.01 to 0.8 parts by weight of an unsaturated carboxylic acid or anhydride thereof having 3 to 8 carbon atoms in the molecule and 0.05 to 0.5 parts by weight of an organic peroxide and melt-mixing these components in an extruder, has an outstanding adhesion to glass fibers. A blend of such a modified polyolefin filled with glass reinforcements has excellent physical properties as well as excellent appearance. The modification of polyolefin may be effected in the presence of a glass reinforcement to achieve both modification and mixing in a single stage, resulting in a composition with superior physical properties owing to improved dispersion and least break down of the glass reinforcement.

24 Claims, 4 Drawing Figures

PRODUCING GLASS-REINFORCED POLYOLEFIN COMPOSITIONS

This invention relates to a process for producing glass filled polyolefins which have excellent physical properties as well as excellent appearance.

Polyolefins possess in nature excellent physical and chemical properties and are useful materials for fibers, films and other molding resins. However, when filled with glass reinforcements, polyolefins are generally less susceptible to reinforcing effect as compared with other thermoplastic resins and hence no reinforced resin compositions satisfactory for practical use are obtained. This is due to lack in affinity and adhesion between a polyolefin which forms the matrix and a glass reinforcement dispersed therein. To make up the defficiency, it is a general practice to treat the surface of the glass reinforcements with a suitable silane coupling agent or the like, thereby enhancing the adhesion between the matrix and the glass. However, with mere surface treatment of the glass reinforcements, it is difficult to greatly enhance the adhesion and to obtain a product having physical properties and appearance in a satisfactory level.

Further, various reports have heretofore been made concerning a method of modifying polyolefins with unsaturated carboxylic acids. For example, there is a process whereby a polyolefin is activated in the presence of a large amount of a solvent by use of a peroxide or an ionizing radiation and reacted with an unsaturated carboxylic acid or a derivative thereof during or subsequent to the activation step. However, such a process involves a complicated reaction procedure, a long reaction time, and a troublesome polymer recovery, thus resulting in difficulty in working. U.S. Pat. Nos. 3,177,269 and 3,177,270 disclose a modifying process whereby a polyolefin in admixture with an unsaturated carboxylic acid is melted and mixed in the presence of an organic peroxide. In an embodiment of the process, an extruder was used for melting and mixing, and in this case, an unsaturated carboxylic acid is used in an amount as large as 1 to 100 parts by weight per 100 parts by weight of a polyolefin. When the modifying treatment is conducted under such conditions using an extruder, serious problems arise such as the discoloration of the polymer, a decrease in molecular weight, deterioration in physical properties due to the presence of the remaining unreacted monomer, and a marked deterioration in appearance such as gloss and smoothness of the surface due to the presence of considerable amounts of homopolymer of the unsaturated carboxylic acid, these resulting in a remarkable degradation in commercial value of the product. There are other modifying processes in which in place of the organic peroxide, an organotin compound is used or the modification is effected by contacting both the polyolefin and the organic peroxide under heating and melting in an extruder. However, a problem of the discoloration of the polymer arises in the case of employing the organotin compounds, and in the case of contacting under heating and melting, an extremely high reaction temperature becomes necessary to attain a high conversion and hence a problem of the degradation and discoloration of polymer is caused.

There are also several reports concerning compositions comprising a modified polyolefin and glass reinforcements blended therewith. For example, U.S. Pat. No. 3,579,476 discloses that a composition having excellent mechanical properties can be obtained by combining a polyolefin modified with 20% by weight or less of an unsaturated carboxylic acid with glass reinforcements. Even in this case, however, the amount un an unsaturated carboxylic acid used in embodiments is as large as 3 to 14% by weight. Accordingly, the end product is not satisfactory in commercial value for the practical uses for the same reason as in the case of U.S. Pat. Nos. 3,177,269 and 3,177,270. For example, in a system involving an unsaturated carboxylic acid which itself forms a homopolymer as well as graft polymer in the modifying step, such as acrylic or methacrylic acid, the surface of the molded articles from compositions reinforced with glass reinforcements becomes extremely unsatisfactory with an increase in unsaturated carboxylic acid content, the gloss becomes inferior and a number of silver streaks appear. In another system involving an unsaturated carboxylic acid which undergoes monomolecular addition reaction without forming a homopolymer such as maleic anhydride, there is a limit in the conversion of reactants by melt-mixing treatment in an extruder, with the result that the use of a large amount of an unsaturated carboxylic acid merely results in an increase in the amount of the remaining unreacted acid, which in turn brings about severe discoloration and deterioration in physical properties of the product polymer. To cope with such difficulties, it is indicated in U.S. Pat. No. 3,579,476 that graft copolymerization of maleic anhydride with styrene or acrylic acid is carried out and the resulting graft polymer is subsequently hydrolyzed into dicarboxylic groups.

The present inventors have considered that the reason why the reinforcing effect of glass reinforcements on polyolefin compositions is specifically low as compared with other crystalline polymers such as nylon, polyacetal and the like is that the molecular structure of the polyolefin per se is free from reactive functional groups, and have done extensive research on a method of modifying polyolefins, taking into consideration the disadvantages of the conventional modifying processes, to find that the adhesion between polyolefin and glass can markedly be improved by reacting the polyolefin with a very small amount of an unsaturated carboxylic acid or an anhydride thereof under specific conditions and in a simple way to introduce the carboxyl groups into the polyolefin molecule to modify the polyolefin, whereby a reinforced polyolefin composite having excellent physical properties and appearance is obtained.

An object of this invention is to provide a reinforced polyolefin composite having excellent physical properties as well as excellent appearance.

Another object of this invention is to provide a simple process for producing the said reinforced polyolefin composite.

Still another object of this invention is to provide a process for modifying a polyolefin and a process for producing a reinforced polyolefin composite, without the disadvantages seen in the conventional processes.

Other objects and advantages of this invention will become apparent from the following description.

According to reinforced invention, there is provided a process for producing a reinforce polyolefin composite which comprises adding to 100 parts by weight of a polyolefin 0.01 to 0.8 part by weight of an unsaturated carboxylic acid or an anhydride thereof having 3 to 8 carbon atoms in the molecule and 0.05 to 0.5 part by weight of an organic peroxide, melt-mixing the resulting admixture in an extruder, blending the resulting modified polyolefin with 5 to 200 parts by weight of a glass reinforcement per 100 parts by weight of the polyolefin, and molding the resulting mixture.

When the unsaturated carboxylic acid is used in the small amount mentioned above, the reaction thereof proceeds in a sufficiently high rate even though it is not subjected to the complicated treatments mentioned in U.S. Pat. No. 3,579,416, and the physical properties of the compositions are remarkably enhanced.

In this invention, the modification of the polyolefin with an unsaturated carboxylic acid is carried out for the sole purpose of enhancing the adhesion and affinity of the polyolefin to glass fibers. In this particular respect, a surprising physical property-enhancing effect is obtained by introducing unsaturated carboxylic acid units in such a very small amount as 0.01 to 0.8 part by weight per 100 parts by weight of the polyolefin, and the invention is characterized by this respect. In addition, according to this invention, a modified polyolefin is easily obtained by mere melt-mixing in an extruder, and a reinforced polyolefin composite having physical properties and appearance far superior to those of conventional compositions and free from the disadvantages which the conventional meltmixing processes have, such as discoloration and a molecular weight decrease of the polymer, because of the use of a very small amount of an unsaturated carboxylic acid. This is a surprising advantage of the present invention which is entirely unexpectable from the prior art processes. The process of this invention can be said to be commercially advantageous since the modifying treatment is completed within a very short period of time and the modified polymer is continuously obtained by extrusion in one step without necessitating any other complicated treatments.

In one of the embodiments of this invention, a polyolefin powder is admixed with a very small amount of an unsaturated carboxylic acid, the admixture is thoroughly mixed and dispersed in a suitable mixer such as Henschel mixer or the like, and the mixture is then fed into an extruder under a nitrogen atmosphere to be allowed to react while being melted and mixed. After removal of volatile matters through a vent hole, the reaction mixture is extruded and the extrudate is fed to a cutter to obtain pellets.

In this invention, the reaction temperature is preferably in the range of from 150° to 280° C., and the reaction period is preferably in the range of from 5 to about 30 minutes. The unsaturated carboxylic acid and organic peroxide may be added, if necessary, after being dissolved in a small amount of a low-boiling solvent.

In filling the modified polymer with glass reinforcements, there may suitably be adopted any of the customary methods such as, for example, a method whereby the polymer pellets are mixed with glass reinforcements in the form of fiber, powder, bead or balloon, and the extruded or injection molded; a method whereby a glass roving or a glass cloth is incorporated by lamination, or a method whereby sheets of the modified polymer are filled by lamination with a glass cloth or the like.

The polyolefin modified with an unsaturated carboxylic acid according to this invention may be used alone or as a master pellet to be mixed with an unmodified polyolefin if necessary. In this case, the modified polyolefin content in the mixture with the unmodified polyolefin is preferably at least 20% by weight. The advantage of the process of this invention will become even more marked when for the purpose of preventing the breakdown of glass fibers and ensuring their uniform dispersion, the modifying treatment is carried out in the presence of glass fibers to effect simultaneously modification of the polyolefin and mixing and dispersion of glass fibers, or, alternatively, glass fibers are continuously fed at a constant rate into the extruder in operation for modifying a polyolefin through a feed hole provided near the orifice to effect the direct dispersion of glass fibers in the modified polyolefin.

The polyolefins for use in this invention include polyethylene, polypropylene, polystyrene, polymethylpentene, polybutene-1, etc. These may be used alone or in admixture of two or more.

Examples of the unsaturated carboxylic acids and anhydrides for use as modifying agents include those having 3 to 8 carbon atoms in the molecule such as acrylic acid, methacrylic acid, maleic acid, fumaric acid, crotonic acid, itaconic acid, and anhydrides thereof. The amount to be used is 0.01 to 0.8 part by weight, preferably 0.05 to 0.5 part by weight per 100 parts by weight of the polyolefin. If the amount used is below 0.01 part by weight, the modifying effect will become insignificant, while if it exceeds 0.8 part by weight, the conversion of the unsaturated carboxylic acid will be markedly reduced. In the case where monomolecular addition predominates, as, for example, is the case with maleic anhydride, if the carboxylic acid or anhydride thereof is used in an amount exceeding 0.8 part by weight, the quantity of the unreacted acid will reach a considerable level, resulting in deterioration in physical properties due to an internal plasticizing effect and discoloration of the product. In the case where polymerization tends to take place predominantly, as, for example, is the case with acrylic acid, if the carboxylic acid is added in an amount exceeding 0.8 part by weight, the efficiency of grafting will be markedly reduced while formation of a homopolymer is enhanced, resulting in extremely inferior appearance of the molded articles with development of many silver streaks.

The organic peroxides to be used are, for example, benzoyl peroxide, lauroyl peroxide, dicumyl peroxide, methyl ethyl ketone peroxide, di-tert-butyl peroxide, tert-butyl hydroperoxide, etc. These may be used alone, or in combination of two or more. The amount to be added is preferably 0.05 to 0.5 part by weight per 100 parts by weight of the polyolefin. If the amount is too small, the conversion of the unsaturated carboxylic acid will decrease, while excessive amounts will result in discoloration and decrease of molecular weight of the polymer produced.

The glass reinforcing materials for use include glass fibers in the form of glass rovings or glass chopped strands; glass cloths, glass powders, glass beads, etc. These may be used each type alone or in combination of two or more types. The amount to be used is 5 to 200 parts by weight, preferably 15 to 100 parts by weight, per 100 parts by weight of the polyolefin.

The reinforced polyolefin composition produced by the process of this invention is superior in physical properties with higher mechanical strengths, higher heat resistance and higher stiffness as compared with conventional compositions, and the molded articles are very good in appearance including smoothness and gloss of the surface. Particular prominent improvements achieved by the process of this invention are that, for example, tensile strength, Young's modulus, flexural strength, heat distortion temperature, hardness, and rigidity are greatly enhanced with an increase in the content of glass reinforcement; that the impact strength at low temperature has no temperature dependency; and that the durability performance at high temperatures, such as mechanical properties, creep characteristics, and fatigue resistance are excellent. Those improvements as mentioned above are due to the strong bonding between the modified polyolefin and glass fibers through reacted unsaturated carboxylic acids or anhydrides thereof. Such strong bonding results in improvement of the over-all physical properties. When the surface of rupture is examined with an electron microscope, a strong bonding between glass fibers and the polyolefin resin is clearly observed in the case where the modified polyolefin of this invention is used, whilst there is observed essentially no bonding in the case where unmodified polyolefin is used, showing distinct difference from the former case.

The accompanying drawings illustrate the physical properties of the reinforced polyolefin composites of this invention in relation to various conditions, in which FIG. 1 shows relationships between the amount of unsaturated carboxylic acid or anhydride thereof and the molecular structure of the modified polypropylene;

Figure 1:
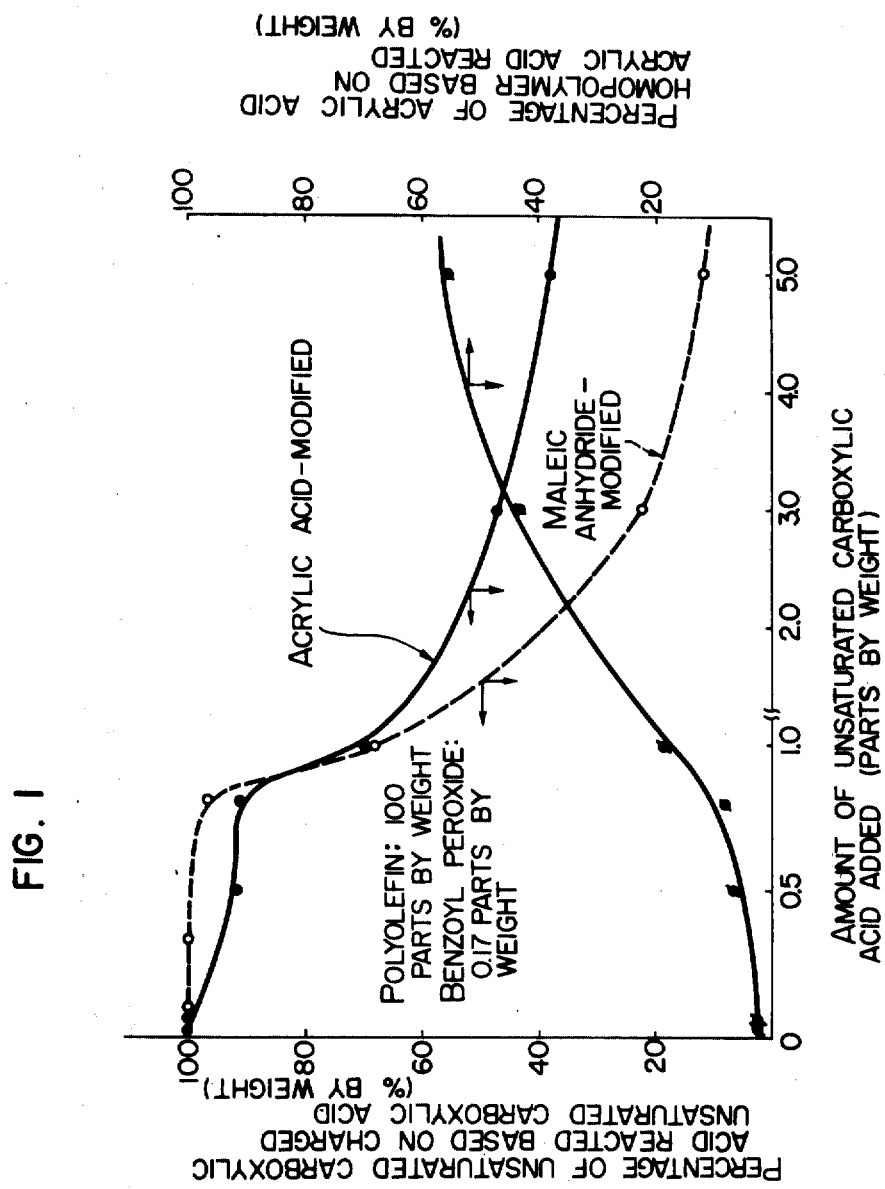

The invention is illustrated below in further detail with reference to Examples.

EXAMPLE 1

To 3,000 g of a polypropylene powder having an interinsic viscosity of 2.95 (as measured in tetralin at 135° C.), were added 15 g of acrylic acid and 5 g of benzoyl peroxide. After having been thoroughly mixed in a Henschel mixer, the mixture was fed to a nitrogen-sealed extruder of the vent type and extruded under such conditions that the residence time is 7 minutes and the temperature is 230° C., to obtain pellets. The proportion of the reacted acrylic acid was 0.46% by weight based on the polypropylene, as measured by infrared absorption spectroscopy, and the intrinsic viscosity of the resulting polymer was 2.80, as measured in tetralin at 135° C. The predetermined amounts of the acrylic acid-modified polypropylene (used as the resin component) and glass chopped strand, 6 mm in length, were charged into a V-shape tumbler and thoroughly mixed. The resulting mixture was extruded at 240° C. in the same extruder as that mentioned above to obtain pellets. The pellets were processed by means of a screw-type injection molding machine into molded article. The molded articles obtained were Type I dumbbell test specimens and rectangular bars, 125 × 10 × 3.2 mm and 125 × 10 × 6.4 mm. These three types of molded articles were used for evaluating the physical properties. In Table 1 are shown the results obtained together with those obtained in Referential Example wherein unmodified polypropylene was treated in the same manner as in this Example.

Table 1

| Polypropylene | Glass fiber content (% by wt.) | HDT (° C) | Izod impact strength (kg.cm/cm$^2$) | Tensile strength (kg/mm$^2$) | Flexural strength (kg/mm$^2$) | Flexural modulus (× 10$^{-4}$ kg/cm$^2$) | Rockwell hardness (M-scale) |
|---|---|---|---|---|---|---|---|
| Acrylic acid-modified polypropylene | 0 | 71.9 | 4.2 | 3.0 | 4.4 | 1.3 | 73.8 |
| | 10 | 123.4 | 5.1 | 4.8 | 6.6 | 3.1 | 83.3 |
| | 20 | 140.6 | 6.3 | 5.9 | 9.1 | 5.3 | 91.2 |
| | 30 | 153.4 | 7.2 | 7.1 | 10.2 | 6.8 | 93.8 |
| Unmodified polypropylene (referential Example) | 0 | 62.4 | 4.5 | 3.1 | 4.3 | 1.2 | 73.1 |
| | 10 | 73.8 | 5.3 | 3.5 | 5.0 | 1.5 | 72.4 |
| | 20 | 78.9 | 6.5 | 3.6 | 5.8 | 3.3 | 72.3 |
| | 30 | 85.2 | 7.0 | 4.2 | 6.1 | 4.7 | 73.4 |

Heat distortion temperature (HDT): ASTM D 648 (18.6 kg/cm$^2$)
Izod impact strength: ASTM D 256 (2.5 mm, notched, 20° C.)
Tensile strength: ASTM D 638 (23° C.)
Flexural strength and modulus: ASTM D 790 (23° C.)
Rockwell hardness: ASTM D 785 (M-scale)

EXAMPLE 2

An acrylic acid-modified polyethylene was obtained in the same manner as in Example 1, except that a low-pressure polyethylene having an intrinsic viscosity of 0.74 (as measured in α-chloronaphthalene at 125° C.) was used in place of polypropylene. The amount of reacted acrylic acid was 0.30% by weight and the intrinsic viscosity of the modified polyethylene was 0.69. The physical properties of the glass fiber-reinforced composite obtained in the same manner as in Example 1 were shown in Table 2 together with those obtained in Referential Example wherein unmodified polyethylene was used.

Table 2

| Polyethylene | Glass fiber content (% by wt.) | HDT (° C) | Tensile strength (kg/mm$^2$) | Flexural strength (kg/mm$^2$) | Rockwell hardness (M-scale) |
|---|---|---|---|---|---|
| Acrylic acid-modified polyethylene | 10 | 120 | 6.1 | 7.2 | 85 |
| | 20 | 163 | 6.2 | 8.6 | 88 |
| | 30 | 179 | 9.0 | 9.7 | 91 |
| Unmodified polyethylene (Referential Example) | 10 | 90 | 4.8 | 5.9 | 76 |
| | 20 | 119 | 6.3 | 7.3 | 77 |
| | 30 | 131 | 7.6 | 8.2 | 78 |

EXAMPLE 3

An acrylic acid-modified polystyrene was obtained in the same manner as in Example 1, except that polystyrene having an intrinsic viscosity of 0.96 (as measured in benzene at 25° C.) was used in place of polypropylene. The amount of reacted acrylic acid was 0.31% by weight and the intrinsic viscosity of the modified polystyrene was 0.94. The results of evaluation on physical properties of the glass fiber-reinforced composite obtained in the same manner as in Example 1 and those of the glass fiber-reinforced composition obtained from unmodified polystyrene were shown in Table 3.

Table 3

| Polystyrene | Glass fiber content (% by wt.) | HDT (° C) | Tensile strength (kg/mm²) | Flexural strength (kg/mm²) | Rockwell hardness (M-scale) |
|---|---|---|---|---|---|
| Acrylic acid-modified polystyrene | 10 | 93 | 7.6 | 9.1 | 84 |
| | 20 | 108 | 9.9 | 10.9 | 90 |
| | 30 | 114 | 12.1 | 12.4 | 97 |
| Unmodified polystyrene (Referential Example) | 10 | 74 | 5.3 | 7.1 | 73 |
| | 20 | 78 | 6.9 | 8.3 | 74 |
| | 30 | 86 | 8.2 | 8.6 | 77 |

EXAMPLE 4

An acrylic acid-modified resin composition was obtained in the same manner as in Example 1, except that poly-4-methylpentene-1 was used in place of polypropylene and the reaction temperature was 260° C. The amount of reacted acrylic acid was 0.26% by weight. The physical properties of the resin composition reinforced with 20% by weight of glass chopped strand and those of the reinforced unmodified poly-4-methylpentene1 composition prepared for comparison were as follows: tensile strength: 5.32 and 3.28 kg/mm², respectively; Izod impact strength: 7.8 and 5.9 kg. cm/cm²; Rockwell hardness: 92 and 83.

As is apparent from the results obtained in Examples 1 to 4, modified polyolefin compositions show generally higher physical properties than unmodified polyolefin compositions, independent of the type of polyolefin. It is characteristic above all that the effect of addition of glass fibers upon HDT and tensile strength.

EXAMPLE 5

To 3,000 g of a polypropylene powder having an intrinsic viscosity of 1.95 (as measured in tetralin at 135° C.) were added 10 g of maleic anhydride and 5 g of benzoyl peroxide, both of which had been dissolved in 200 g of acetone. After having been thoroughly mixed in a Henschel mixer, the mixture was fed to a nitrogen-sealed 30 mm-extruder and extruded under such conditions that residence time is 5 minutes and the temperature is 170° C., to obtain pellets. The amount of the reacted maleic anhydride was 0.33% by weight, and the intrinsic viscosity of the resulting polymer was 1.65 as measured in tetralin at 135° C. The predetermined amounts of the maleic anhydride-modified polypropylene (used as the resin component) and glass chopped strand, 6 mm in length, were charged into a V-shape tumbler nd thoroughly mixed. The resulting mixture was extruded at 180° C. by the same extruder as mentioned above to obtain pellets. The pellets were processed by means of a screw-type injection molding machine into molded articles. The results of evaluation of the physical properties were as shown in Table 4.

Table 4

| Polypropylene | Glass fiber content (% by wt.) | HDT (° C) | Isod impact strength (kg.cm/cm²) | Tensile strength (kg/mm²) | Flexural strength (kg/mm²) | Flexural modulus (× 10⁻⁴ kg/cm²) | Rockwell hardness (M-scale) |
|---|---|---|---|---|---|---|---|
| Maleic anhydride-modified polypropylene | 0 | 71.9 | 2.5 | 3.0 | 3.9 | 1.1 | 73.8 |
| | 10 | 118.5 | 6.6 | 4.3 | 6.2 | 2.8 | 81.2 |
| | 20 | 135.6 | 8.1 | 5.5 | 8.3 | 4.6 | 90.3 |
| | 30 | 147.8 | 9.9 | 6.8 | 9.9 | 6.3 | 94.5 |
| Unmodified polypropylene | 0 | 72.6 | 3.0 | 3.1 | 4.1 | 1.2 | 73.3 |
| | 10 | 78.4 | 5.2 | 3.2 | 4.9 | 1.4 | 71.5 |
| | 20 | 88.5 | 6.9 | 3.3 | 5.5 | 3.4 | 72.5 |
| | 30 | 95.9 | 7.4 | 4.1 | 5.6 | 4.9 | 74.3 |

EXAMPLE 6

A modified polypropylene was prepared in the same manner as in Example 1 or 5, except that the amount of acrylic acid, maleic anhydride or organic peroxide to be added was changed and conditions for extrusion were also changed. The results of evaluation of the physical properties were shown in Table 5 and FIG. 1 In Table 5 and FIG. 1, the amount of the unsaturated carboxylic acid or anhydride reacted was measured by infrared absorption spectroscopy. In FIG. 1, the percentage of acrylic acid homopolymer based on the acrylic acid reacted was calculated from the value as measured by infrared absorption spectroscopy on the reaction product after extraction with water for 48 hours.

Table 5

| Type of unsaturated carboxylic acid or anhydride | Amount of unsaturated carboxylic acid or anhydride added (parts by weight) | Type of organic peroxide | Amount of organic peroxide added (parts by weight) | Reaction temperature (° C.) | Reaction time (min.) |
|---|---|---|---|---|---|
| Acrylic acid | 0.01 | BPO | 0.17 | 230 | 7 |
| | 0.05 | " | " | " | " |
| | 0.50 | " | " | " | " |
| | 0.80 | " | " | " | " |
| | 1.00 | " | " | " | " |
| | 3.00 | " | " | " | " |
| | 5.00 | " | " | " | " |
| | 0.50 | " | 0.05 | " | " |
| | " | " | 1.00 | " | " |
| | " | " | 0.17 | " | 20 |
| | " | " | " | " | 40 |

Table 5-continued

| | | | | 200 | 7 |
|---|---|---|---|---|---|
| | | " | " | 270 | " |
| | 0.10 | BPO | 0.17 | 170 | 5 |
| | 0.33 | " | " | " | " |
| | " | " | " | " | 30 |
| Maleic | " | " | " | 260 | 5 |
| anhyd- | 0.80 | " | " | 170 | " |
| ride | 1.00 | " | " | " | " |
| | 3.00 | " | " | " | " |
| | " | " | 0.70 | " | " |
| | 5.00 | " | 0.50 | " | " |
| | 0.33 | MEKP | 0.17 | 170 | 5 |
| | " | DTBP | " | 200 | " |

Note:
BPO Benzoyl peroxide
MEKP Methyl ethyl ketone peroxide
DTBP di-tert-Butyl peroxide

| [η](135° C, tetralin) | Amount of Reacted carboxylic acid or anhydride (part by weight) | Color | Composition admixed with 20% of glass fibers | | |
|---|---|---|---|---|---|
| | | | HDT (° C) | Gloss | Silver streak* |
| 2.92 | 0.01 | Colorless | | Excel. | Excel. |
| 2.81 | 0.05 | " | | " | " |
| 2.83 | 0.46 | " | | " | " |
| 2.81 | 0.75 | " | | Good | Fair |
| 2.57 | 0.70 | Light yellow | | Fair | Poor |
| 2.42 | 1.46 | " | | Poor | " |
| — | 1.98 | Yellow | | " | " |
| 2.94 | 0.21 | Colorless | | Excel. | Excel. |
| 1.98 | 0.46 | Yellow | | " | " |
| 2.74 | 0.43 | Light yellow | | " | " |
| 2.04 | 0.49 | " | | " | Good |
| 2.89 | 0.41 | Colorless | | " | Excel. |
| 2.14 | 0.46 | Yellow | | " | " |
| 1.88 | 0.10 | Colorless | 134.0 | | |
| 1.65 | 0.33 | " | 135.6 | | |
| 1.46 | 0.33 | Light yellow | — | | |
| 1.34 | 0.32 | " | — | | |
| 1.66 | 0.78 | Colorless | 138.8 | | |
| 1.55 | 0.69 | Yellow | 125.5 | | |
| 1.44 | 0.65 | Brown | 120.4 | | |
| 1.20 | 0.76 | Dark brown | — | | |
| 1.33 | 0.58 | " | 120.0 | | |
| 1.63 | 0.33 | Colorless | 134.4 | | |
| 1.61 | 0.32 | " | 136.3 | | |

*Silver streak appears more often in the order of Excel. < Good < Fair < Poor.

When 1.0 part by weight or more of acrylic acid were added, many silver streaks appeared on the surface of the articles molded from the glass fiber-reinforced composite and the gloss deteriorated markedly. One of the factors for such a phenomenon seems to be the formation of a homopolymer, as is evident from FIG. 1 of the accompanied drawings. When 1.0 part by weight or more of maleic anhydride were added, discoloration of the polymer becomes critical, conversion decreases markedly, and HDT of the glass fiber-reinforced composite also decreased. As is clear from the above-mentioned results, the amount of an unsaturated carboxylic acid or anhydride thereof to be added is preferably in the range from 0.01 to 0.8 parts by weight per 100 parts by weight of the polyolefin in view of both physical properties and appearance of the molded articles.

EXAMPLE 7

Modified polypropylenes were prepared in a manner similar to that in Example 1 by use of various unsaturated carboxylic acids or anhydrides thereof in place of acrylic acid. Physical properties of the composites reinforced with 20% by weight of glass fibers were evaluated to obtain the results as shown in Table 6. From the results it is seen that the above-said reinforced composites show superior physical properties compared with reinforced unmodified polyolefin composition, though there are some differences according to the type of unsaturated carboxylic acid.

Table 6

| Unsaturated carboxylic acid and anhydride (A) | Modified polypropylene | | HDT (° C) | Tensile strength (kg/mm²) | Flexural strength (kg/mm²) | Flexural modulus (× 10⁻⁴ kg/cm²) | Rockwell hardness (M-scale) |
|---|---|---|---|---|---|---|---|
| | [η](135° C, in tetralin) | Amount of reacted (A) (% by wt.) | | | | | |
| Maleic acid | 2.78 | 0.42 | 139.8 | 6.0 | 9.2 | 5.1 | 90.2 |
| Fumaric acid | 2.81 | 0.41 | 140.2 | 6.1 | 9.2 | 5.1 | 92.2 |
| Crotonic acid | 2.75 | 0.44 | 132.4 | 5.5 | 8.1 | 4.5 | 88.4 |
| Crotonic anhydride | 2.73 | 0.36 | 130.3 | 5.3 | 7.6 | 4.1 | 88.0 |
| Itaconic acid | 2.83 | 0.42 | 129.5 | 5.2 | 7.7 | 3.9 | 85.5 |
| Methacrylic | 2.78 | 0.40 | 129.5 | 5.2 | 8.5 | 4.9 | 90.1 |

Table 6-continued

| Unsaturated carboxylic acid and anhydride (A) | Modified polypropylene | | HDT (° C) | Tensile strength (kg/mm²) | Flexural strength (kg/mm²) | Flexural modulus (× 10⁻⁴ kg/cm²) | Rockwell hardness (M-scale) |
|---|---|---|---|---|---|---|---|
| | [η](135° C, in tetralin) | Amount of reacted (A) (% by wt.) | | | | | |
| acid | | | | | | | |

EXAMPLE 8

To 3,000 g of a polypropylene powder having an intrinsic viscosity of 2.95 (as measured in tetralin at 135° C.), were added 15 g of acrylic acid and 5 g of benzoyl peroxide. After having been thoroughly mixed in a Henschel mixer, the mixture was further admixed with the predetermined amount of glass chopped strand, 6 mm in length, and uniformly mixed and dispersed in a V-shape tumbler. The resulting uniform mixture was fed to a nitrogen-sealed vent type extruder, and extruded under such conditions that the residence time is 7 minutes and the temperature is 230° C., to obtain pellets. The amount of reacted acrylic acid was 0.41% by weight based on polypropylene. The intrinsic viscosity of the modified polypropylene isolated by extraction with xylene was 2.79 as measured in tetralin at 135° C. The results of evaluation of the physical properties were as shown in Table 7. The physical properties were generally superior as compared with the case of the two-stage method of Example 1 (modification and glass fiber loading in separate steps). This is seemingly due to less breakdown and uniform dispersion of glass fibers in the present Example.

Table 7

| Glass fiber content (% by wt.) | HDT (° C) | Izod impact strength (kg.cm/cm²) | Tensile strength (kg/mm²) | Flexural strength (kg/mm²) | Flexural modulus (× 10⁻⁴ kg/cm²) | Rockwell hardness (M-scale) |
|---|---|---|---|---|---|---|
| 0 | — | — | — | — | — | — |
| 10 | 134.8 | 6.2 | 6.2 | 6.9 | 4.2 | 90.2 |
| 20 | 150.9 | 7.4 | 7.8 | 10.2 | 6.6 | 94.5 |
| 30 | 156.5 | 8.3 | 8.8 | 11.9 | 7.8 | 98.3 |

EXAMPLE 9

A modified polypropylene prepared in the same manner as in Example 1 was mixed with unmodified polypropylene pellets in various proportions and each mixture was blended with glass chopped strand, 6 mm in length, in a proportion so as to obtain a compound containing 20% by weight of the chopped strand. Each compound was thoroughly mixed in a V-shape tumbler to ensure uniform dispersion and then extruded to obtain pellets from which injection molded products were prepared. The results of evaluation of the physical properties were as shown in Table 8. When unmodified polypropylene content exceeded 50% by weight of the total polypropylene, the physical properties of the composite deteriorated to some extent, yet the composite maintained a higher level of physical properties than unmodified polypropylene.

Table 8

| Unmodified polypropylene content (% by wt.) | HDT (° C) | Izod impact strength (kg.cm/cm²) | Flexural strength (kg/mm²) | Flexural modulus (× 10⁻⁴ kg/cm²) | Tensile strength (kg/mm²) | Rockwell hardness (M-scale) |
|---|---|---|---|---|---|---|
| 0 | 140.6 | 6.3 | 9.1 | 5.3 | 5.9 | 91.2 |
| 10 | 140.0 | 6.2 | 9.2 | 5.3 | 5.7 | 90.8 |
| 30 | 138.5 | 6.4 | 9.0 | 5.1 | 5.8 | 90.6 |
| 50 | 134.5 | 6.6 | 8.2 | 5.2 | 5.0 | 85.6 |
| 80 | 130.6 | 6.5 | 7.3 | 4.3 | 4.8 | 83.9 |
| 100 | 78.9 | 6.5 | 5.8 | 3.3 | 3.6 | 72.3 |

EXAMPLE 10

Figure 2:
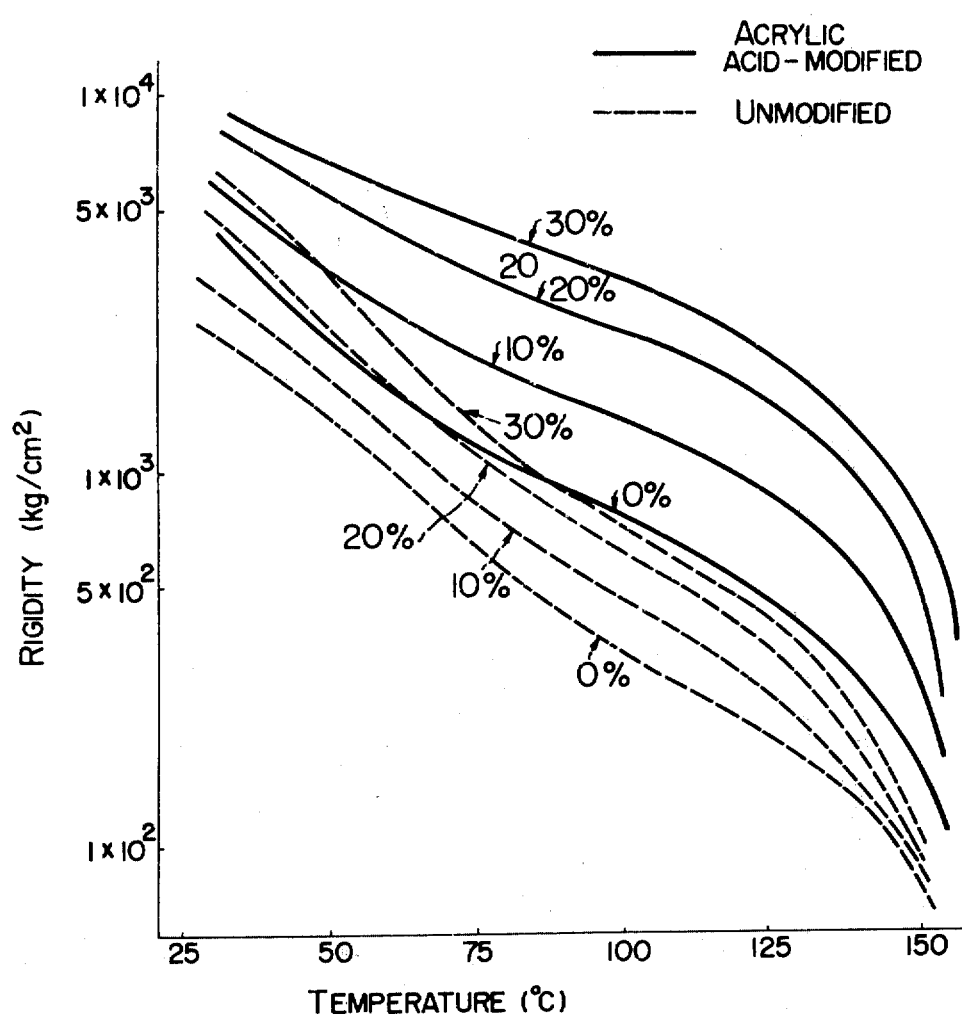
FIG. 2 shows relationships between rigidity of the glass fiber-reinforced resin composites and temperature.

Relationships between modulus of rigidity and temperature were examined on various samples obtained in Example 1. Measurements were conducted according to the Clash-Berg testing method using test specimens of the size 6.2 × 10.0 × 3.2 mm, and comparison was made between glass fiber-reinforced composites of the modified resin and those of unmodified resin. The results obtained were as shown in FIG. 2, wherein figures represent glass fiber content of the specimen. It is seen from FIG. 2 that acrylic acid-modified resin composites showed superior rigidity than unmodified resin composites indicating remarkable improvement in reinforcing effect of glass fibers in the case of modified resin.

EXAMPLE 11

Figure 3:
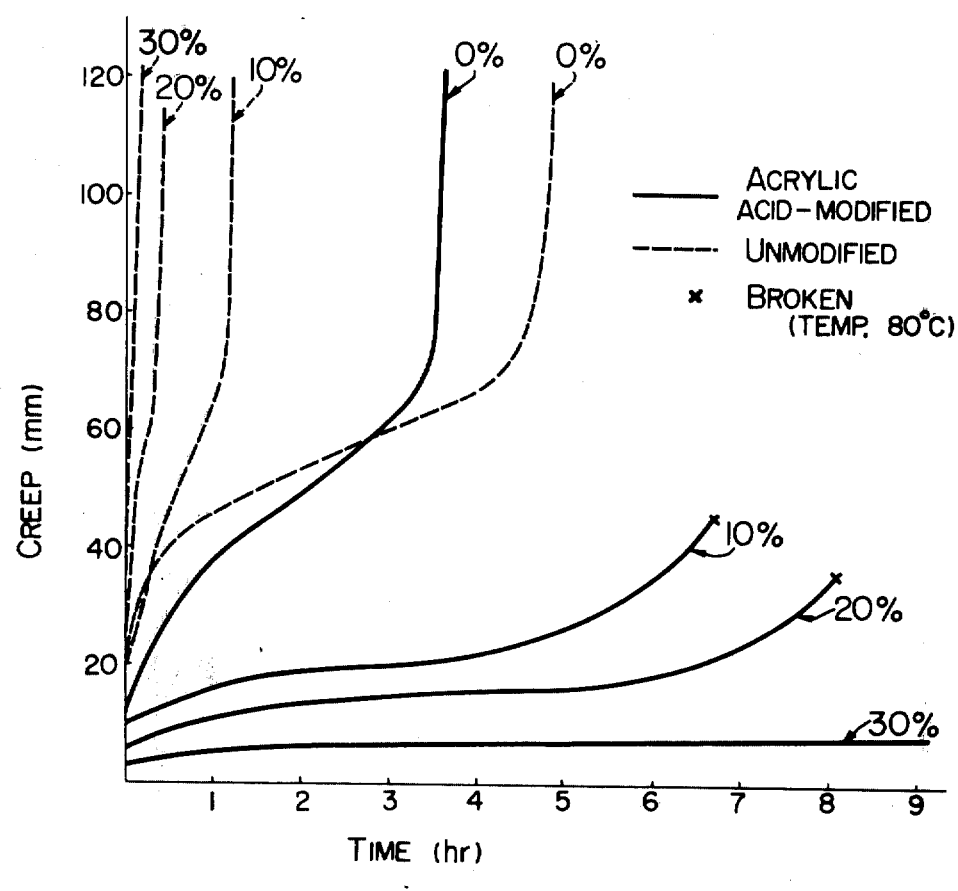
FIG. 3 shows creep characteristics.

Evaluation of creep characteristics was made on various samples obtained in Example 1. Measurements were conducted on Type III dumbbell test specimen fabricated from the injection molded sheet, under the following test conditions: load, 15 kg; stress, 102 kg/cm²; distance between clamps, 50 mm; temperature, 80° C. The results obtained were as shown in FIG. 3. Acrylic acid-modified resin composites showed far smaller constant creep rate than unmodified resin composites. In the case of unmodified resin composites the constant creep rate tends to increase with the increase in glass fiber content, whereas the reverse is the case with modified resin compositions, indicating remarkable improvement in the reinforcing effect of glass fibers.

EXAMPLE 12

Figure 4:
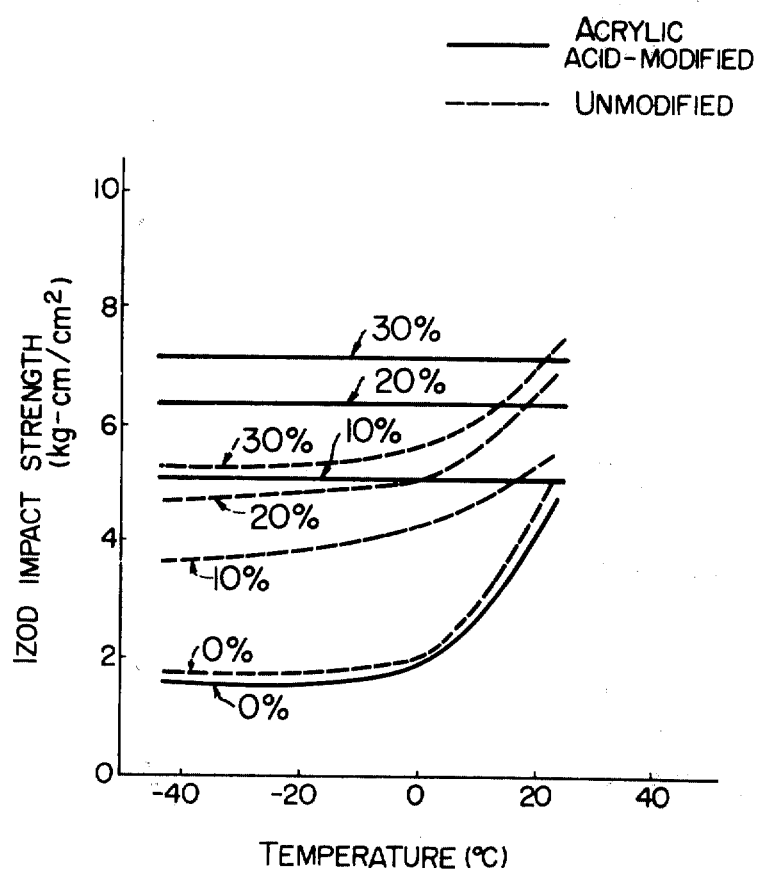
FIG. 4 shows relationship between impact strength and temperature.

Low-temperature impact strength was measured on various samples obtained in Example 1. The results obtained were as shown in FIG. 4, wherein figures represent the glass fiber content. The impact strength of the unmodified resin composites decreased with the decrease in temperature, independent of the glass fiber content, whereas in the case of acrylic acid-modified resin composites the impact strength of the composite filled with glass fibers showed little temperature dependency and the composite maintained a high level of impact strength at low temperatures.

What is claimed is:

1. In an extrusion process for providing a glass-reinforced polyolefin composite comprising the addition of an unsaturated carboxylic acid or anhydride thereof having 3 to 8 carbon atoms and 0.05 to 0.5 parts by weight of an organic peroxide to 100 parts by weight of a polyolefin, meltmixing the mixture in an extruder to form a modified polyolefin, and blending the resulting modified polyolefin with 5 to 200 parts by weight of a glass reinforcement, the improvement which comprises:

controlling the amount of the unsaturated carboxylic acid or anhydride thereof added within a range of 0.01 to 0.8 parts by weight, the unsaturated carboxylic acid or anhydride thereof serving as the essential agent to enhance adhesion and affinity of the polyolefin to the glass reinforcement.

2. In an extrusion process for providing a glass-reinforced polyolefin composite comprising the addition of an unsaturated carboxylic acid or anhydride thereof having 3 to 8 carbon atoms, 0.05 to 0.5 parts by weight of an organic peroxide and 5 – 200 parts by weight of a glass reinforcement to 100 parts by weight of a polyolefin, melt-mixing the mixture in an extruder to form a modified polyolefin blended with the glass reinforcement the improvement which comprises:

controlling the amount of the unsaturated carboxylic acid or anhydride thereof added within a range of 0.01 to 0.8 parts by weight, the unsaturated carboxylic acid or anhydride thereof serving as the essential agent to enhance adhesion and affinity of the polyolefin to the glass reinforcement.

3. A process according to claim 1, wherein the polyolefin is polypropylene.

4. A process according to claim 2, wherein the polyolefin is polypropylene.

5. A process according to claim 1, wherein the polyolefin is polyethylene.

6. A process according to claim 2, wherein the polyolefin is polyethylene.

7. A process according to claim 1, wherein the unsaturated carboxylic acid is acrylic acid or methacrylic acid.

8. A process according to claim 2, wherein the unsaturated carboxylic acid is acrylic acid or methacrylic acid.

9. A process according to claim 1, wherein the anhydride of an unsaturated carboxylic acid is maleic anhydride.

10. A process according to claim 2, wherein the anhydride of an unsaturated carboxylic acid is maleic anhydride.

11. A process according to claim 1, wherein 0.05 to 0.5 part by weight of the unsaturated carboxylic acid or anhydride thereof is used.

12. A process according to claim 2, wherein 0.05 to 0.5 part by weight of the unsaturated carboxylic acid or anhydride thereof is used.

13. A process according to claim 1, wherein the organic peroxide is at least one compound selected from the group consisting of benzoyl peroxide, lauroyl peroxide, dicumyl peroxide, methyl ethyl ketone peroxide, di-tertbutyl peroxide, and tert-butyl hydroperoxide.

14. A process according to claim 2, wherein the organic peroxide is at least one compound selected from the group consisting of benzoyl peroxide, lauroyl peroxide, dicumyl peroxide, methyl ethyl ketone peroxide, di-tert-butyl peroxide, and tert-butyl hydroperoxide.

15. A process according to claim 1, wherein the glass reinforcement is at least one member selected from the group consisting of glass fiber, glass powder, glass bead, and glass balloon.

16. A process according to claim 2, wherein the glass reinforcement is at least one member selected from the group consisting of glass fiber, glass powder, glass bead, and glass balloon.

17. A process according to claim 1, wherein the modified polyolefin is a mixture of a modified polyolefin and an unmodified polyolefin, and the modified polyolefin content of said mixture is at least 20% by weight.

18. A process according to claim 1, wherein the polyolefin, unsaturated carboxylic acid or anhydride thereof, and organic peroxide are mixed to modify the polyolefin in a melt-mixing equipment having a cylinder and a screw rotating therein and forming, in sequence, a feeding zone, metering zone, decompression zone, and transport zone, under such conditions that the reaction temperature is 150° to 280° C. and the reaction period is 5 to 30 minutes.

19. A process according to claim 2, wherein the polyolefin, unsaturated carboxylic acid or anhydride thereof, organic proxide and the glass reinforcement are mixed to modify the polyolefin and disperse the glass reinforcement in a melt-mixing equipment having a cylinder and a screw rotating therein and forming, in sequence, a feeding zone, metering zone, decompression zone, and transport zone, under such conditions that the reaction temperature is 150° to 280° C. and the reaction period is 5 to 30 minutes.

20. A process according to claim 9, wherein the amount of maleic anhydride is 0.05 to 0.8% by weight.

21. A process according to claim 1, wherein the amount of unsaturated carboxylic acid or anhydride thereof is 0.05 to 0.8% by weight.

22. A process according to claim 2, wherein the amount of unsaturated carboxylic acid or anhydride thereof is 0.05 to 0.8% by weight, and the melting and kneading is carried out under a nitrogen atmosphere.

23. A process of claim 1, wherein said unsaturated carboxylic acid or anhydride thereof is acrylic acid, methacrylic acid, maleic acid, fumaric acid, crotonic acid, itaconic acid and their anhydrides.

24. A process of claim 2, wherein said unsaturated carboxylic acid or anhydride thereof is acrylic acid, methacrylic acid, maleic acid, fumaric acid, crotonic acid, itaconic acid and their anhydrides.

* * * * *